(12) United States Patent
Collaud et al.

(10) Patent No.: US 10,710,787 B2
(45) Date of Patent: Jul. 14, 2020

(54) LAMINATED PACKAGING MATERIAL, PACKAGING CONTAINERS MANUFACTURED THEREFROM AND A METHOD FOR MANUFACTURING THE LAMINATE MATERIAL

(71) Applicant: TETRA LAVAL HOLDINGS & FINANCE S.A., Pully (CH)

(72) Inventors: Alain Collaud, St-Aubin (CH); Hans Johansson, Lomma (SE); Nils Toft, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 157 days.

(21) Appl. No.: 15/780,329

(22) PCT Filed: Nov. 25, 2016

(86) PCT No.: PCT/EP2016/078750
§ 371 (c)(1),
(2) Date: May 31, 2018

(87) PCT Pub. No.: WO2017/093125
PCT Pub. Date: Jun. 8, 2017

(65) Prior Publication Data
US 2018/0354690 A1 Dec. 13, 2018

(30) Foreign Application Priority Data
Dec. 2, 2015 (EP) ...................................... 15197562

(51) Int. Cl.
*B65D 65/40* (2006.01)
*B32B 27/32* (2006.01)
(Continued)

(52) U.S. Cl.
CPC ................ *B65D 65/40* (2013.01); *B32B 7/12* (2013.01); *B32B 15/08* (2013.01); *B32B 15/085* (2013.01);
(Continued)

(58) Field of Classification Search
CPC ....... B32B 15/08; B32B 15/085; B32B 15/20; B32B 2250/05; B32B 2255/12;
(Continued)

(56) References Cited

U.S. PATENT DOCUMENTS 10,328,666 B2  6/2019 Nyman et al.
2008/0107899 A1  5/2008 Lu
(Continued)

FOREIGN PATENT DOCUMENTS

CN 101528462 A 9/2009
CN 101827706 A 9/2010
(Continued)

OTHER PUBLICATIONS

Office Action (The First Office Action) dated Aug. 29, 2019, by the State Intellectual Property Office of People's Republic of China in corresponding Chinese Patent Application No. 201680070547.6 and an English Translation of the Office Action. (16 pages).
(Continued)

*Primary Examiner* — Yan Lan
(74) *Attorney, Agent, or Firm* — Buchanan Ingersoll & Rooney PC

(57) ABSTRACT

The present invention relates to a laminated cellulose-based liquid or semi-liquid food packaging material, comprising a brown or dark bulk layer from non-bleached, cellulose-based material, an outside substrate layer having a white print surface to hide the dark colour of the bulk layer, and on the inside an oxygen barrier layer and an innermost heat sealable layer. The invention further relates to the method
(Continued)

Figure 1A:
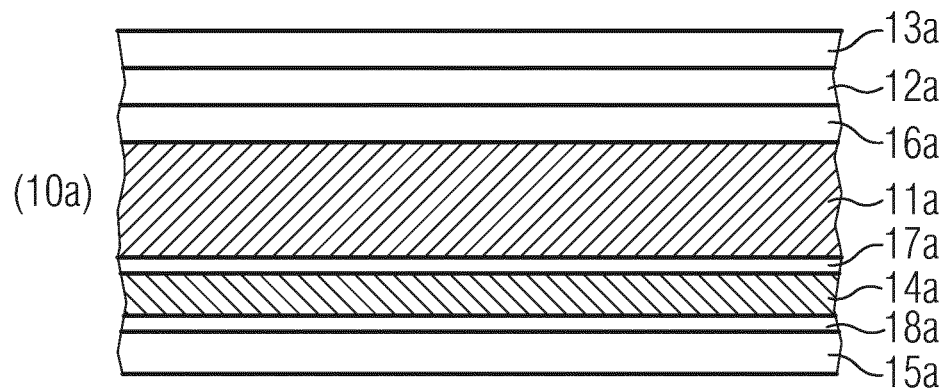

for manufacturing the laminated packaging material and to a packaging container for liquid food packaging, comprising the laminated packaging material.

14 Claims, 6 Drawing Sheets

(51) Int. Cl.
*B32B 27/20* (2006.01)
*B32B 7/12* (2006.01)
*B32B 15/085* (2006.01)
*B32B 29/00* (2006.01)
*B32B 37/12* (2006.01)
*B32B 27/34* (2006.01)
*B65D 85/72* (2006.01)
*B32B 23/04* (2006.01)
*B32B 29/06* (2006.01)
*B32B 23/08* (2006.01)
*B32B 27/36* (2006.01)
*B32B 27/08* (2006.01)
*B32B 15/08* (2006.01)
*B32B 29/02* (2006.01)
*B32B 15/20* (2006.01)
*B32B 27/12* (2006.01)
*B32B 37/00* (2006.01)

(52) U.S. Cl.
CPC ............ *B32B 15/20* (2013.01); *B32B 23/042* (2013.01); *B32B 23/08* (2013.01); *B32B 27/08* (2013.01); *B32B 27/12* (2013.01); *B32B 27/20* (2013.01); *B32B 27/205* (2013.01); *B32B 27/32* (2013.01); *B32B 27/34* (2013.01); *B32B 27/36* (2013.01); *B32B 29/00* (2013.01); *B32B 29/002* (2013.01); *B32B 29/005* (2013.01); *B32B 29/02* (2013.01); *B32B 29/06* (2013.01); *B32B 37/0053* (2013.01); *B32B 37/12* (2013.01); *B65D 85/72* (2013.01); *B32B 2250/05* (2013.01); *B32B 2255/12* (2013.01); *B32B 2255/26* (2013.01); *B32B 2307/31* (2013.01); *B32B 2307/402* (2013.01); *B32B 2307/4023* (2013.01); *B32B 2307/4026* (2013.01); *B32B 2307/41* (2013.01); *B32B 2307/514* (2013.01); *B32B 2307/518* (2013.01); *B32B 2307/7242* (2013.01); *B32B 2307/7244* (2013.01); *B32B 2307/7265* (2013.01); *B32B 2307/75* (2013.01); *B32B 2439/00* (2013.01); *B32B 2439/06* (2013.01); *B32B 2439/40* (2013.01); *B32B 2439/46* (2013.01); *B32B 2439/60* (2013.01); *B32B 2439/62* (2013.01); *B32B 2439/70* (2013.01)

(58) Field of Classification Search
CPC ............ B32B 2255/26; B32B 2307/31; B32B 2307/402; B32B 2307/4023; B32B 2307/4026; B32B 2307/41; B32B 2307/514; B32B 2307/518; B32B 2307/7242; B32B 2307/7244; B32B 2307/7265; B32B 2307/75; B32B 23/042; B32B 23/08; B32B 2439/00; B32B 2439/06; B32B 2439/40; B32B 2439/46; B32B 2439/60; B32B 2439/62; B32B 2439/70; B32B 27/08; B32B 27/12; B32B 27/20; B32B 27/205; B32B 27/32; B32B 27/34; B32B 27/36; B32B 29/00; B32B 29/002; B32B 29/005; B32B 29/02; B32B 29/06; B32B 37/0053; B32B 37/12; B32B 7/12; B65D 65/40; B65D 85/72
See application file for complete search history.

(56) References Cited

U.S. PATENT DOCUMENTS

| 2009/0047525 | A1* | 2/2009 | Tilton | ............ B32B 27/20 428/441 |
|---|---|---|---|---|
| 2012/0103856 | A1 | 5/2012 | Toft et al. | |
| 2018/0304607 | A1 | 10/2018 | Öhman et al. | |
| 2018/0305098 | A1 | 10/2018 | Nyman et al. | |
| 2018/0311940 | A1 | 11/2018 | Toft et al. | |
| 2018/0319559 | A1 | 11/2018 | Toft et al. | |
| 2019/0202191 | A1 | 7/2019 | Toft et al. | |

FOREIGN PATENT DOCUMENTS

| EP | 2 949 597 A1 | 12/2015 |
|---|---|---|
| WO | WO 2011/003567 A1 | 1/2011 |
| WO | WO 2012/093036 A1 | 7/2012 |

OTHER PUBLICATIONS

International Search Report (PCT/ISA/210) dated Feb. 13, 2017, by the European Patent Office as the International Searching Authority for International Application No. PCT/EP2016/078750.
Written Opinion (PCT/ISA/237) dated Feb. 13, 2017, by the European Patent Office as the International Searching Authority for International Application No. PCT/EP2016/078750.

* cited by examiner

LAMINATED PACKAGING MATERIAL, PACKAGING CONTAINERS MANUFACTURED THEREFROM AND A METHOD FOR MANUFACTURING THE LAMINATE MATERIAL

TECHNICAL FIELD

The present invention relates to a new liquid packaging laminated packaging material having an outermost layer of a white, cavitated polymer film, and to a method for manufacturing the laminated packaging material.

Furthermore, the invention relates to packaging containers comprising the laminated packaging material or being made of the laminated packaging material in its entirety. In particular, the invention relates to packaging containers intended for liquid food packaging, comprising the laminated packaging material.

BACKGROUND

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Any other material to compete with such foil-based materials must be cost-efficient regarding raw materials, have comparable food preserving properties, be sufficiently mechanically stable and have a comparably low complexity in the conversion into a finished packaging laminate.

Decreasing the costs of today's packaging material further, can be made by down-gauging the thickness of the polymer layers or by seeking to replace the aluminium foil barrier by one or more different barrier layers, which has proven to be quite a challenge. A way of saving costs, which has hitherto not been seen as practical in the field of liquid carton packaging, would be by down-gauging the cellulose-based bulk layer by type and/or amount of cellulose fibre material. It normally leads to the important properties of mechanical strength and packaging integrity, as well as material barrier properties, being jeopardized and has previously been considered as a less favourable way forward. The paperboard is a major part of liquid carton packaging material, however also representing a major part of the total packaging material costs.

SUMMARY

It is now, considering the above, an object of the present invention to realise a new way of reducing costs of laminated cellulose-based liquid- or semi-liquid food packaging materials.

It is also a general object of the invention to provide a laminated cellulose-based packaging material at reduced cost, having sufficient mechanical stability as well as good print surface properties, which fulfil the needs in liquid carton laminated packaging materials.

It is a further object of the invention to provide a low-cost such laminated packaging material having a reduced content of materials not based on biodegradable and renewable materials, i.e. less of materials from sources exploiting fossil raw materials.

A yet further object, is to provide a laminated cellulose-based packaging material based on a down-gauged, low-cost bulk or core layer, which has no suitable surface for a printed decorative pattern, but a rough, dark or brown surface directed to the outside of a packaging container made from a liquid packaging material comprising such a bulk layer, the final packaging material still having comparable print surface qualities to conventional such packaging laminates.

A further object still, is to enable cost-efficient differentiation of the outside layer of a laminated packaging material, i.e. the layer which will attract and appeal to consumers, on the outside of a packaging container. Such outside layers may according to the method of the invention easily be swapped, such that different decorative and/or tactile features may be laminated into the material, according to different desires among dairy and filler customers, consumers and retailers. Such customisation makes it possible to produce separate, shorter series of differently decorated and tailor-made packaging materials, without creating stoppages, waste and logistics problems in the main stream of the material manufacturing line. Most conventionally, a white print surface is desired, and one desirable print substrate would be a white polymer film, which may also be used at least partly as a heat sealable layer on the outside of the package. When the bulk material layer is not white by a clay-coat coating, but has a brown or dark colour, such a white film has, however, hitherto not been able to hide the dark background in order to produce a sufficiently white background.

Some or all of these objects are thus attainable according to the present invention by the laminated packaging material, the method of manufacturing the packaging material as well as a packaging container made therefrom, as defined in the appended claims.

DETAILED DESCRIPTION

With the term "long-term storage" in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package durability, i.e. the resistance to leakage or breakage of a packaging container. A main contribution to this property is that within a packaging laminate there is provided good internal adhesion between adjacent layers of the laminated packaging material. Another contribution comes from the material resistance to defects, such as pinholes, ruptures and the like within the material layers, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers.

The term "liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air.

With the term "bulk layer" is normally meant the thickest layer or the layer containing the most material in a multi-layer laminate, i.e. the layer which is contributing most to the mechanical properties and the dimensional stability of the laminate and of packaging containers folded from the laminate. In the context of the present invention, it may also mean the layer providing a greater thickness distance in a sandwich structure, which further interacts with stabilising facing layers, which have a higher Young's modulus, on each side of the bulk layer, in order to achieve sufficient such mechanical properties and dimensional stability.

A "spacer layer" is a layer that creates a distance or space between significantly thinner material layers, which have a higher Young's modulus and density, such as an oriented film, metal foil or a high-density, high-tensile stiffness paper layer, foil or film, arranged on each side of the spacer layer, i.e. stiffness- and stability-providing layers, so-called facing layers. The spacer layer has a lower or reduced inherent bending stiffness and thus does not itself contribute much directly to the bending stiffness of a laminated packaging material. Indirectly, it may contribute very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. A "bulk layer" may comprise a "spacer layer" and a further combined layer within the bulk, but may also be the same as a spacer layer.

According to a first aspect of the invention, there is provided a laminated cellulose-based, liquid- or semi-liquid food packaging material, for heat sealing into aseptic packaging containers, comprising a bulk material layer comprising a brown or dark, i.e. not white, cellulose-based fibre material, a layer comprising an oxygen barrier layer arranged on the inside of the bulk layer, i.e. on the side to be directed inwards to the filled food product in a packaging container made from the laminated material, and further on the inside of the oxygen barrier layer, an innermost, heat sealable and liquid-tight layer of a thermoplastic polymer, the innermost polymer layer intended to be in direct contact with the packaged food product, the laminated packaging material further comprising a print substrate layer arranged on the outside of the bulk layer, wherein the print substrate layer is a white pre-manufactured, oriented, cavitated film from a thermoplastic polymer composition comprising mineral particles and white pigment particles.

The print surface is thus separately made from the bulk layer, on a print substrate layer and integrated into the packaging material as a laminate layer instead. With brown or dark, is meant something that is coloured away from white, such that it would not be suitable for a print surface, but would influence the final colours to some degree, thus including beige and every colour that needs to be hidden by the print substrate, and which is not white. The bulk material layer having such a coloured, brown or beige or dark surface would thus be disturbing the print operation and the resulting colours of the printed décor on the packaging material.

The thermoplastic polymer may comprise a polyolefin, such as a high density polyethylene (HDPE). Alternative polyolefins, such as polypropylene are possible for the purpose of providing a print substrate layer, but for the print substrate layer to be also heat sealable in connection with the innermost layer comprising LDPE and LLDPE polymers, a polymer composition comprising in the majority an HDPE is preferred for the print substrate film layer.

The thermoplastic polymer composition may comprises a polyolefin and from 40 to 85 weight-%, such as from 50 to 70 weight-%, such as from 50 to 60 weight-% of inorganic filler particles. When the print substrate film is created, the inorganic filler particles are first mixed into a melt of the polymer matrix. The thus obtained molten filler-polymer blend is extruded under high pressure and shear forces such that a homogeneous film is formed, and subsequently cooled into a solid polymer film. This extrusion cast film is subsequently orientated in one or two axial directions, in order to form small cavities or voids in the polymer matrix, around the particulate inorganic fillers. The cavities are formed due to loss of adhesion between the polymer matrix and the inorganic filler particle at stretching of the film, such that two walls are formed in the polymer matrix towards the particle. It is the thus formed walls in the polymer around the particles, which cause light diffraction in the film such that it becomes opaque or white or whitish in its appearance. The stretching ratio of the polymer film depends on the type of inorganic filler particles as well as the type of polymer in the composition, but it seems that for polyolefins such as polypropylene and HDPE, it could vary from 2 to 6 in each of the CD (cross direction) and MD (machine direction) stretching direction. The size of the inorganic filler particles may be from 0.1 to 10 µm, such as from 0.2 to 2 µm.

The thermoplastic polymer composition comprises a polyolefin and from 40 to 85 weight-%, such as from 50 to 70 weight-%, such as from 50 to 60 weight-% of inorganic filler particles and from 1 to 10 weight-%, such as from 1 to 5 weight-% of white pigments. In a particular embodiment, the composition comprises such an inorganic filler and pigment composition and a polymer comprising in the majority a high density polyethylene, HDPE, or such a composition with pure HDPE.

The thickness of the film may be from 22 to 35 µm, such as from 23 to 30 µm, such as from 23 to 28 µm. At such a thickness and composition with inorganic filler particles in a stretched film, there will both be some stiffness properties and Young's modulus of the obtained film, in order to support a bulk layer in a sandwich layer configuration, wherein the bulk layer has a lower bending stiffness and lower Young's modulus of its own, as well as sufficient white colour of a laminate from this film onto a brown fluting cellulose-based bulk material. Of course, a thicker such film is always possible to make, but less economical.

The mineral filler particles may be selected from the group consisting of dolomite, talcum, mica and calcium carbonate $CaCO_3$.

In a preferred embodiment, the mineral filler particles are selected from the group consisting of dolomite and calcium carbonate $CaCO_3$.

In a yet further embodiment, the polymer composition of the print substrate layer film, also comprises a white pigment, which is titanium oxide.

The bulk material layer may have a grammage from 100 to 300 g/m$^2$, such as from 100 to 200 g/m$^2$.

Furthermore, the bulk material layer may comprise a cellulose-based containerboard material, such as fluting material or linerboard material, such as a semi-chemical fluting material made of 100% primary fibres made of birch or a Kraft liner material.

An example of a bulk material layer is made from a containerboard material, i.e. a fluting material or a linerboard material, and has a rather high density but a lower inherent bending stiffness and other differences in mechanical properties, compared to conventional liquid packaging paperboard, such that the dimensional and mechanical stability of packages made from a bulk layer of a fluting material would be deteriorated by conventional manufacturing of a packaging laminate.

In particular, it has a substantially lower bending stiffness itself compared to a laminated packaging material suitable for liquid packaging. Bending stiffness is not commonly measured on containerboard materials, since they were anyway intended for corrugated carton manufacturing, but it has been measured that such materials have a bending stiffness at least 30%, such at least 40% such at least 50% lower, than the bending stiffness of a liquid carton paperboard, at a corresponding grammage when excluding the printable coating (clay-coat) grammage. It still contributes to the total bending stiffness of a laminated packaging material, however, by providing a distance layer in a sandwich construction between facing layers, which have a higher Young's modulus, and by having higher compression strength properties in the in-plane (x-y) of the layer, than conventional paperboard for liquid packaging. Generally, fluting materials have a higher bending stiffness per grammage than linerboard materials.

Containerboard is also known as corrugated case material (CCM), and the materials needed for a corrugated case material are a corrugated medium (or fluted medium) which is, in use, fluted (welled) and then arranged by glueing between two flat linerboards or liner mediums. Such a corrugated construction provides a high sandwich structure bending stiffness, due to the fluted intermediate layer, which is acting as a distance or spacer layer between the two, relatively thinner, liner layers. The two types of paper that make up containerboard are thus linerboard material, also commonly called Kraft liner or Test liner, and fluting (or corrugating medium) material. Since containerboard materials mainly are made out of natural unbleached cellulose fibres, they are generally brown or beige, although the shade may vary depending on the type of cellulose. There are, however, also white top linerboards, which have a white top layer on one surface and which are normally more expensive materials.

Liner board normally has a density lower than 850 kg/m3, such as lower than 835 kg/m3, is brown or beige and comprises mainly softwood fibres, such as spruce or pine fibres.

Fluting is thus a paper product normally used as corrugating medium in corrugated container-paperboards, having a density of from 600 to 750 kg/m$^3$, such as from 600 to 700 kg/m$^3$, normally around 650 kg/m$^3$. Fluting paper is brown or beige and contains mostly short fibres, and is, just like linerboard, generally a low-cost, low-quality paper, which is not in itself suitable for manufacturing of liquid carton packages. However, when used as a spacer layer in a sandwich structure, it may work well for the purpose of liquid carton packaging, and at a substantially lower price, if the paper grade is of an approved kind and combined in the right way with the right layers in such a packaging laminate. The fluting medium would, however, form a spacer layer, which is non-fluted, by being a lower-stiffness, lower-cost fibrous material that may provide sufficient distance in a sandwich construction for a laminated liquid carton packaging material. Fluted spacer layers, i.e. well-formed spacer layers, are not within the scope of the present invention. Corrugated carton materials would pose quite different technical implications and requirements to liquid carton laminated packaging materials, and will not be dealt with here.

The fibres generally used in the manufacture of linerboard or fluting mediums may be recycled fibres and new, i.e. virgin fibres. The properties of paper are dependent on the structural characteristics of the various fibres that compose the sheet. Generally, the higher the content of virgin fibres, the stronger and stiffer (higher compression resistance) the fluting or linerboard material will be. The fluting material that has been explored for the purpose of this invention is a semi-chemical fluting made of 100% virgin fibres made of hardwood, such as birch, from Powerflute. Birch is an optimal fluting raw material. Its structure contains high concentrations of lignin and hemicellulose. The pulping process preserves the naturally highly hydrophobic lignin and modifies the remaining hemicellulose so that the soft and flexible cellulose core of the fibre is protected. This provides higher stiffness and lower creep properties. When used for liquid packaging, fluting materials available on the market need to be complemented with one or more additional sizing agent during the cellulose web manufacturing, in order to cope with the liquid and high-moisture conditions for this new use and application. Conventional sizing technologies and chemicals (AKD, ASA, rosin, etc.) can be used for the fluting material in order to meet the necessary requirements for the specific product.

Linerboard made of virgin fibres, is called kraft liner, whereas linerboard from recycled fibres is known as testliner. Also mixes of virgin and recycled fibres are possible. Kraft linerboard should have at least 80 wt %, and preferably 100 wt % of virgin fibres. The fibres used for linerboard are longer than those used in fluting material, and since lineboard is originally intended for the outer, liner layers of a carton material, they are also sized with sizing agents in order to withstand different degrees of moisture and wet conditions.

Containerboard materials thus have lower bending stiffness than corresponding paperboards for liquid packaging, but they have, on the other hand, a higher SCT index, i.e. a higher SCT value per grammage unit in the machine direction (MD), than a normal liquid paperboard material, or other paper or cellulose material that would be suitable in this context. The SCT value is a property measured by the international standard ISO9895, and which is relied on to compare different containerboard materials with each other. The SCT or Short Compression Test measures the internal compression resistance of paper fibres, i.e. the in-plane compression strength of a paper, in CD and MD. This property varies with the grammage of the specific paper measured on. Grammage of paper products is measured according to ISO 536.

Packages made from a material having a higher SCT index, have better stackability, and it is thus a measurement of compression strength per grammage in the in-plane (x-y plane) of a carton material. Containerboard materials normally have an SCT index of at least 30 Nm/g in MD, as measured according to ISO 9895 and ISO 536, and would thus provide i.a. the required compression strength and stackability properties for a liquid paperboard laminate. These materials do not need to be optimised regarding bending stiffness properties, since they will only be used as (non-fluted) spacer layers in laminated materials for liquid carton packaging. Thus, whereas such linerboard materials originally are intended for facing layers in a corrugated carton sandwich structure, they will for the purpose of the present invention be used as the spacer layer in a laminated structure, having further facing layers laminated on each side thereof, in order to provide the required bending stiffness properties for liquid carton laminated materials.

For comparison, today's liquid paperboard materials have an SCT index of about 25 Nm/g, but are then also optimised regarding all other properties, since they are relied on as the main provider of dimensional stability in liquid carton laminated packaging materials. When replacing today's optimised liquid paperboard with a low-cost spacer layer in a sandwich structure in a laminate, such a spacer layer needs to have a higher SCT index, of at least 30 Nm/g, in order to compensate for the loss of properties when removing the state-of-the-art paperboard.

Since the new spacer layer will be laminated to further facing layers in a sandwich configuration in a laminate structure, there is no need to provide a white or smooth (e.g. clay-coated) printing surface on the spacer layer itself. Also in that respect, the container board materials are thus suitable materials for such a spacer layer.

Regarding moisture resistance, these materials may have a Cobb water adsorption value of lower than 35 g/m2, in order to function better in a liquid carton packaging laminate. The Cobb value is measured according to ISO 535, and is fulfilled by most linerboard materials already, while some fluting materials may need additional sizing in order to be used as a non-fluted spacer layer in a liquid carton packaging laminate. Accordingly, a containerboard material in a bulk layer, comprises at least one sizing additive.

The print substrate layer film may be laminated to the bulk layer by an aqueous adhesive composition, which is applied at an amount from 0.5 to 4 g/m2 and partly absorbed into the cellulose surface of the bulk layer.

Alternatively, the print substrate layer film may be laminated to the bulk layer by extrusion lamination with a molten interjacent thermoplastic bonding layer, thus forming a laminate upon solidification of the molten bonding layer.

The print substrate layer film may be further coated on its non-laminated, outer side with an outermost, transparent, protective layer of a thermoplastic polymer.

The thermoplastic polymer of the innermost heat sealable layer may be a polyolefin, such as polyethylene.

Suitable thermoplastic polymers for outermost and innermost heat sealable liquid-tight layers in the laminated packaging material of the invention, are polyolefins such as polyethylene and polypropylene homo- or co-polymers, preferably polyethylenes and more preferably polyethylenes selected from the group consisting of low density polyethylene (LDPE), linear LDPE (LLDPE), single-site catalyst metallocene polyethylenes (m-LLDPE) and blends or copolymers thereof. According to a preferred embodiment, the outermost heat sealable and liquid-tight layer is an LDPE, while the innermost heat sealable, liquid-tight layer is a blend composition of m-LLDPE and LDPE for optimal lamination and heat sealing properties. The outer- and innermost thermoplastic polymers layers may be applied by (co-)extrusion coating of the molten polymer to a desired thickness. According to another embodiment, the outer- and/or innermost liquid-tight and heat sealable layers may be applied in the form of pre-manufactured, oriented or non-oriented films. The outermost heat-sealable, liquid-tight and protective thermoplastic polymer layer may alternatively be applied by means of an aqueous dispersion coating of a thermoplastic polymer, when only low thickness of such an outermost layer is desired, or when such a process is preferable for other reasons.

The oxygen barrier layer may be an aluminium foil and/or a polymer film having gas barrier properties.

In a preferred embodiment, the oxygen barrier properties are provided by an aluminium foil laminated on the inside of the bulk layer, in combination with a further barrier layer comprising at least 50 wt-% of a polyamide. Such a further barrier layer may preferably be arranged between the aluminium foil barrier and the innermost heat sealable layer. At this layer location, the polyamide barrier layer may be active as both additional oxygen barrier and as a barrier towards free fatty acids migrating from the filled food product into and outwards through the packaging material.

In particular, when a polyamide is added on the inner side of a metal barrier layer, this prevents free fatty acids from the packed food product to migrate from the food to the metal barrier layer, and thus the barrier properties of the barrier layer(s) may be kept intact and the adhesion of the inside heat sealed polymer layers to the metal barrier may be maintained for a longer shelf-life time.

The further barrier layer may comprise a polyamide in a blend with an ethylene vinyl alcohol (EVOH). The EVOH material also contributes to the additional barrier properties in a similar way to the polyamide, but has not the same advantageous processability properties in melt (co-) extrusion coating and lamination operations. Similar considerations apply to polyethylene therephthalate (PET) and a blend of a polyamide and a PET is also useful in accordance with the invention. The further barrier layer may thus comprise a polyamide at 50 weight % or higher in a blend with a polyethylenetherephthalate (PET).

The polyamide may comprise an aromatic or semi-aromatic polyamide. Such polyamides may provide better barrier properties towards migrating free fatty acids, why such a combination is particularly advantageous for packaging of fruit juices and the like.

Alternatively, the oxygen barrier layer may be a polymer film or a thin paper sheet which is coated with a barrier coating.

Thus, a polymer film or thin, high-density paper substrate may be barrier-coated with an aqueous dispersion or solution of a thermoplastic barrier polymer, or alternatively deposited with a vapour deposition coating, such as by a physical vapour deposition coating such as a metallization coating, or by a plasma enhanced chemical vapour deposition process (PECVD) of e.g. a SiOx or AlOx coating.

According to a second aspect of the invention, there is provided a liquid- or semi-liquid food packaging container comprising the laminated packaging material according to the invention as defined above. The packaging container can be made from the laminated packaging material entirely, by fold-forming a sheet- or web-shaped blank into a cuboid or other fold-shaped package or merely into a pouch package. Alternatively, it may be used as a packaging material sleeve, to be combined with plastic bottle tops or the like.

The packaging containers of the invention have at least the same performance regarding mechanical properties, barrier properties and outside appearance as containers made from a similar packaging material based on a conventional liquid packaging paperboard, and at a substantially lower material cost.

According to a third aspect of the invention, a method is provided for manufacturing of the laminated cellulose-based, liquid- or semi-liquid food packaging material of the invention, comprising the steps, in any order, of a) laminating the print substrate layer to a first, outer side of the brown or dark cellulose-based bulk material layer, b) laminating the oxygen barrier layer or coating to the other, opposite side of the bulk layer, and c) applying the innermost heat sealable thermoplastic polymer layer on the non-laminated (in)side of the oxygen barrier layer.

The print substrate layer may be laminated to the bulk material layer by applying an aqueous adhesive composition onto the print substrate layer and allowing the adhesive composition to absorb into the cellulose surface of the bulk layer, while pressing the layers to adhere to each other by letting them pass through at least one lamination roller nip.

When lamination is done by aqueous adhesive absorption lamination, there is a further advantageous effect. It is a lamination method wherein only a very small amount of polymer adhesive is applied and binding the two surfaces to be laminated together, while the aqueous medium or solvent is absorbed into the cellulose fiber network of the laminated layer(s) and no further drying or heating is needed. While less thermoplastic bonding material is needed, than in melt extrusion lamination, the relative proportion of paper or cellulose-based material layers in the packaging material is increased. Furthermore, the barrier layers may be down-gauged, if there are efficient combinations of properties of the various material layers included in the laminated packaging material, such as inherent barrier properties in the adhesive polymer, such as in PVOH or starch.

The gas barrier layer of a metal foil or a barrier-coated polymer film may be laminated to the inside of the bulk layer by a bonding adhesive of an acrylic-modified polyethylene copolymer, applied at an amount from 0.5 to 3 $g/m^2$, such as from 1-2 $g/m^2$, such as from 1-1.5 $g/m^2$, dry content. It has been seen that it works well to laminate such a gas barrier layer to the bulk layer of fluting material with just a very low amount of an aqueous adhesive composition having a dry content of 30 to 50 weight %, which is allowed to be partly absorbed into the network of fibres of the bulk layer cellulose surface, such that only about 2 $g/m^2$ of the adhesive polymer is applied and laminating the surfaces together.

When the gas barrier layer is a barrier-coated high-density paper, it may more suitably be laminated to the inside of the bulk layer by a bonding adhesive of an starch or polyvinyl alcohol (PVOH) or similar adhesive, which is applied at an amount from 0.5 to 4 $g/m^2$, such as from 1 to 3 $g/m^2$, such as from 2 to 3 $g/m^2$, dry content Alternatively, it is of course also possible to laminate the gas barrier layer to the bulk layer by melt extrusion laminating a layer of a thermoplastic polymer, such as a polyolefin, such as polyethylene, such as low density polyethylene (LDPE) as the interjacent bonding layer between the two surfaces to be laminated.

The same thermoplastic polyolefin-based materials, in particular polyethylenes, as listed above regarding the outermost and innermost layers, are also suitable in bonding layers interior of the laminated material, i.e. in extrusion lamination layers formed from the molten extruded lamination polymer.

Suitable adhesive polymers for extrusion lamination bonding layers interior of the laminated material, i.e.

between an outer heat sealable layer and the barrier- or primer-coated substrate layer, or for bonding the barrier film to the bulk layer in a mono- or multilayer such bonding laminate layer, are the so-called adhesive thermoplastic polymers, such as modified polyolefins, which are mostly based on LDPE or LLDPE co-polymers or, graft co-polymers with functional-group containing monomer units, such as carboxylic or glycidyl functional groups, e.g. (meth) acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

Corresponding modified polypropylene-based thermoplastic adhesives or bonding layers may also be useful, depending on the requirements of the finished packaging containers.

Such adhesive polymer layers or tie layers are thus normally applied together with the outermost layer or with the further bulk-to-barrier bonding layers in a co-extrusion coating operation.

Typically, a high-density paper, barrier coating substrate layer for the purpose of the invention, may have a Young's modulus from 1 to 10 GPa, such as from 5 to 10 GPa.

The bending stiffness of a packaging material laminate is depending on the thicknesses and the Young's moduli of the individual layers. For balancing mechanical properties of a sandwich laminated material structure, the facing layers of the sandwich configuration should be arranged on each, respective, side of the spacer layer, such that they have substantially equal extensional stiffness. The extensional stiffness is given by the product of Young's modulus and thickness.

According to a further aspect of the laminated packaging materials obtained, the outermost heat sealable liquid-tight layers of the laminated material may be provided as one or two pre-manufactured films. Thus, such a film may be pre-laminated to the barrier layer, in a first pre-laminate material to be laminated to the first side of the bulk layer, and/or pre-laminated to a printed and decorated outside surface layer to be laminated to the second side of the bulk layer. When films are pre-laminated to barrier layers or printed, decorated layers, it may be by mere heat-pressure lamination of the films to the other layers, especially if a pre-coated or integrated layer of an adhesive polymer such as EAA or EMAA is present on one of the lamination surfaces. Alternatively, it may be by means of melt extrusion lamination, which is more expensive due to the higher consumption of interjacent melt extrusion polymer, or by pre-coating with a small amount of an aqueous adhesive that may penetrate into the at least one paper or cellulose-based surface to be laminated, without any drying step needed.

Within the general quest of lowering costs of laminated packaging materials, it is highly desired to combine properties in the various layers such that as few as possible additional layers are needed.

When the conventional liquid packaging paperboard of today's packaging laminate is replaced by lower-cost bulk layers, enabling significant cost savings, some additional costs may instead be spent on various tailor-made décor substrates for printing and decorating the laminated packaging material. Since the bulk layer of the invention will no longer constitute a print-surface, i.e. a surface to be printed, the expensive clay-coat may be omitted from the bulk layer, and a smooth and white print surface may be obtained by other means, on the outside print substrate facing film or sheet, to be laminated to the outer side of the bulk layer. Such a print substrate may for example be a white or coloured film or a white printable paper facing layer, and in particular a white printable thermoplastic polymer film, which may also contribute to heat sealing when sealing to the outside of the package. The printing onto a such white printable substrate polymer film, and the possible further lamination of it to outermost heat sealable layers, may take place in a prior lamination operation in order to provide the second pre-laminated material for the second side, as an outside pre-made laminate module, i.e. a second pre-laminated material, of the laminated packaging material.

By thus detaching the print surface layer from the bulk layer, versatility in possible outside appearances becomes possible and this is a further advantage of the modular lamination model of this invention. Even further oxygen barrier layers may be included in the second pre-laminated material in order to enhance the total barrier performance of the final laminated material.

EXAMPLES AND DESCRIPTION OF PREFERRED EMBODIMENTS

Figure 1B:
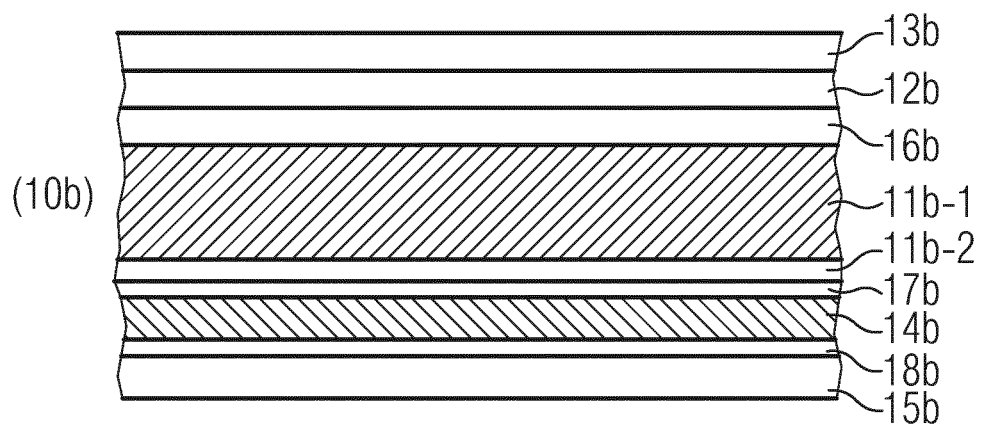
Figure 2A:
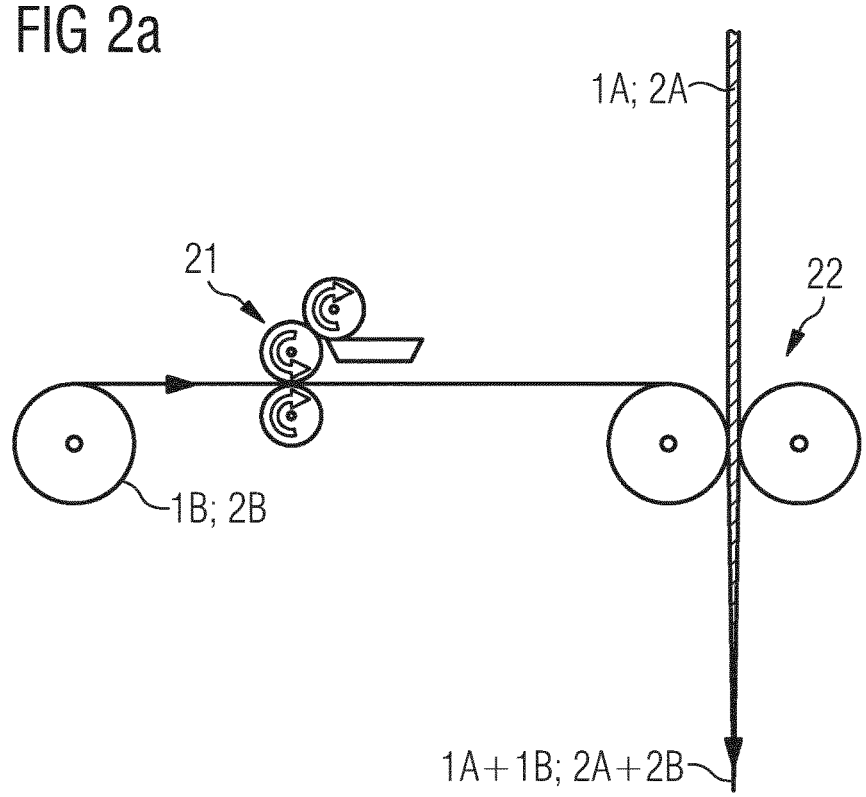
Figure 2B:
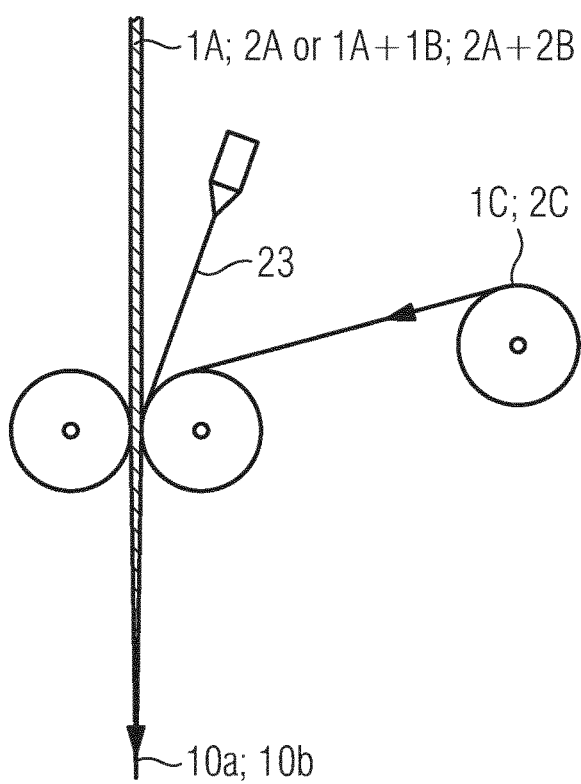
Figure 3A:
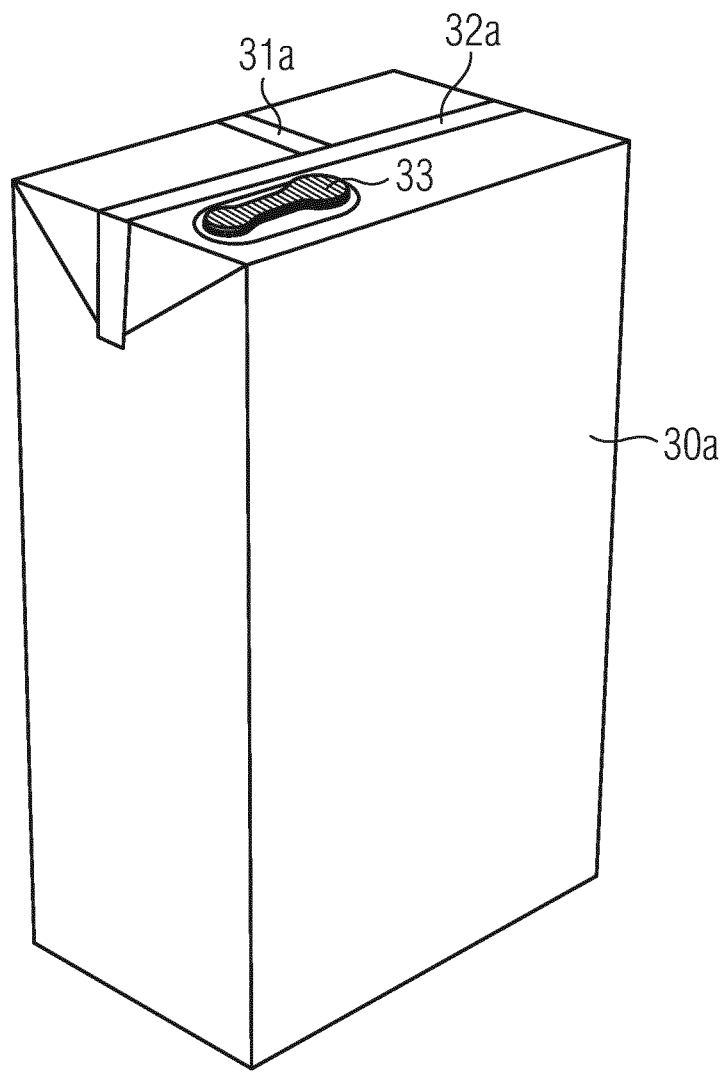
Figure 3B:
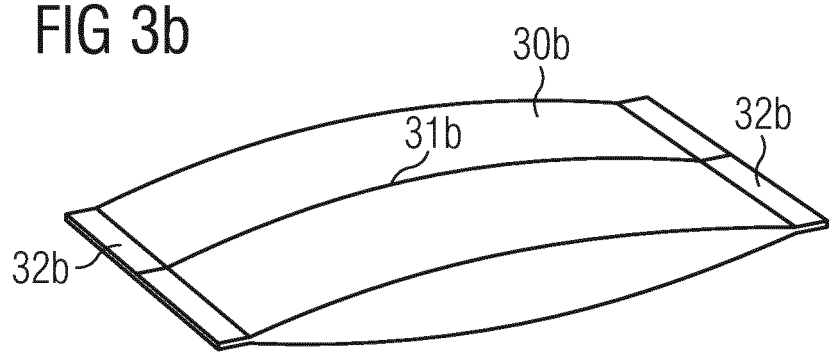
Figure 3C:
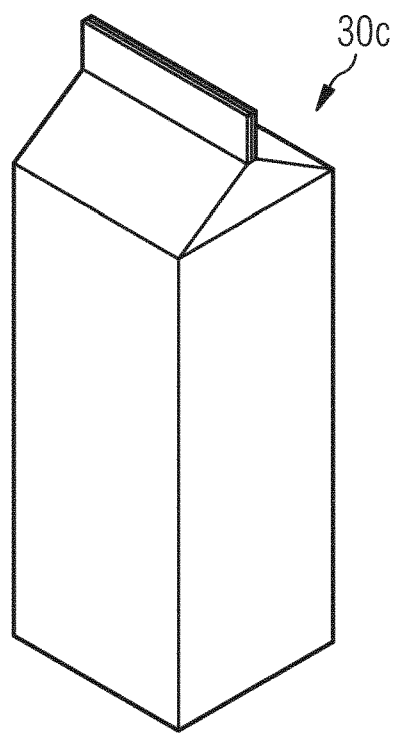
Figure 3D:
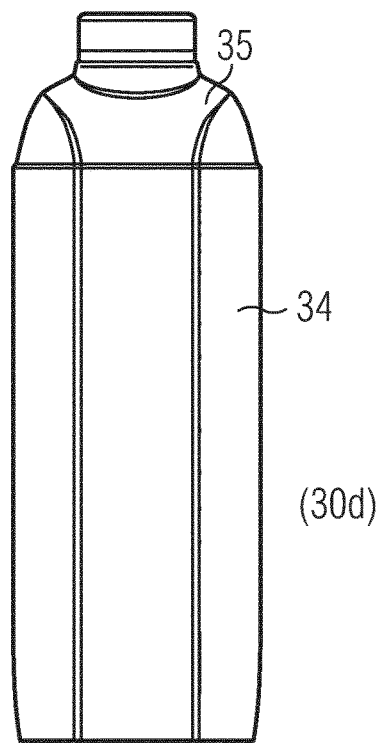
Figure 4:
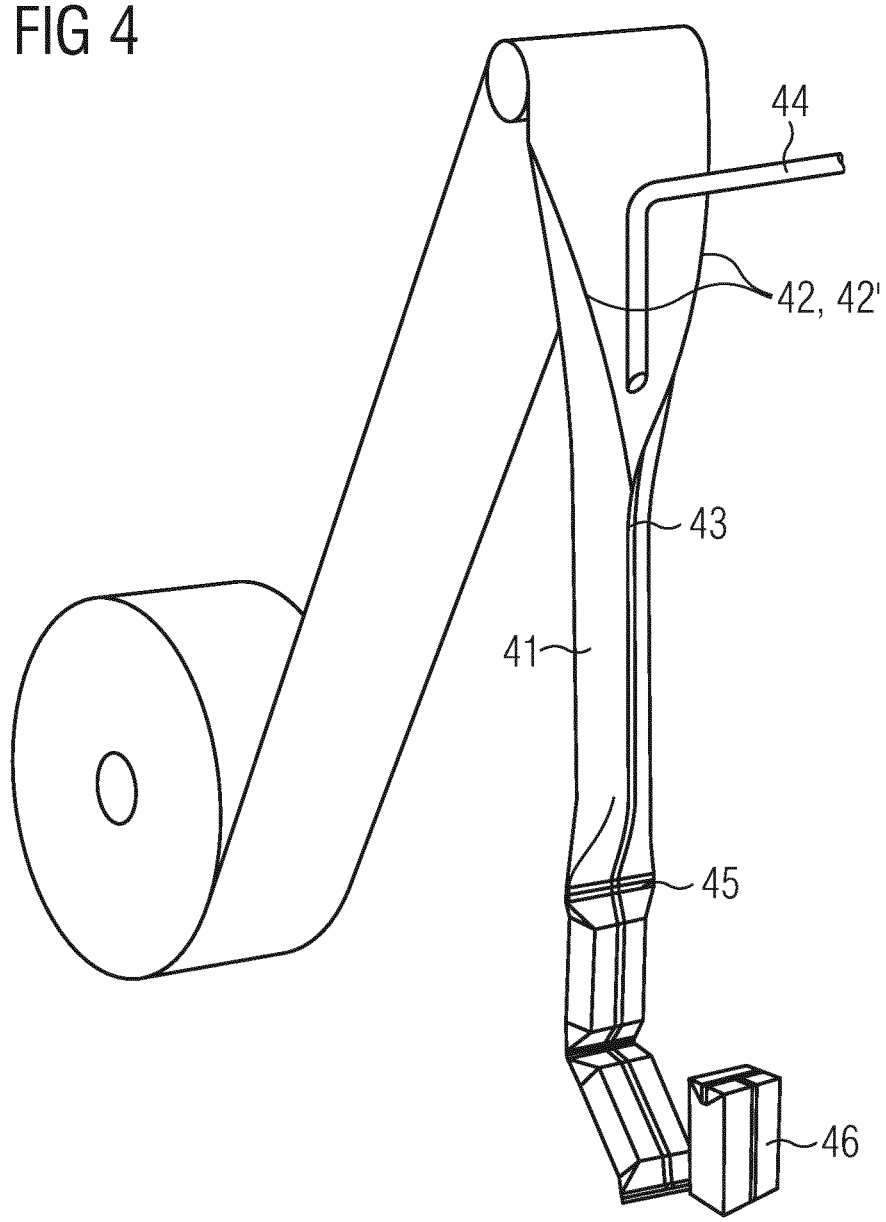
Figure 5:
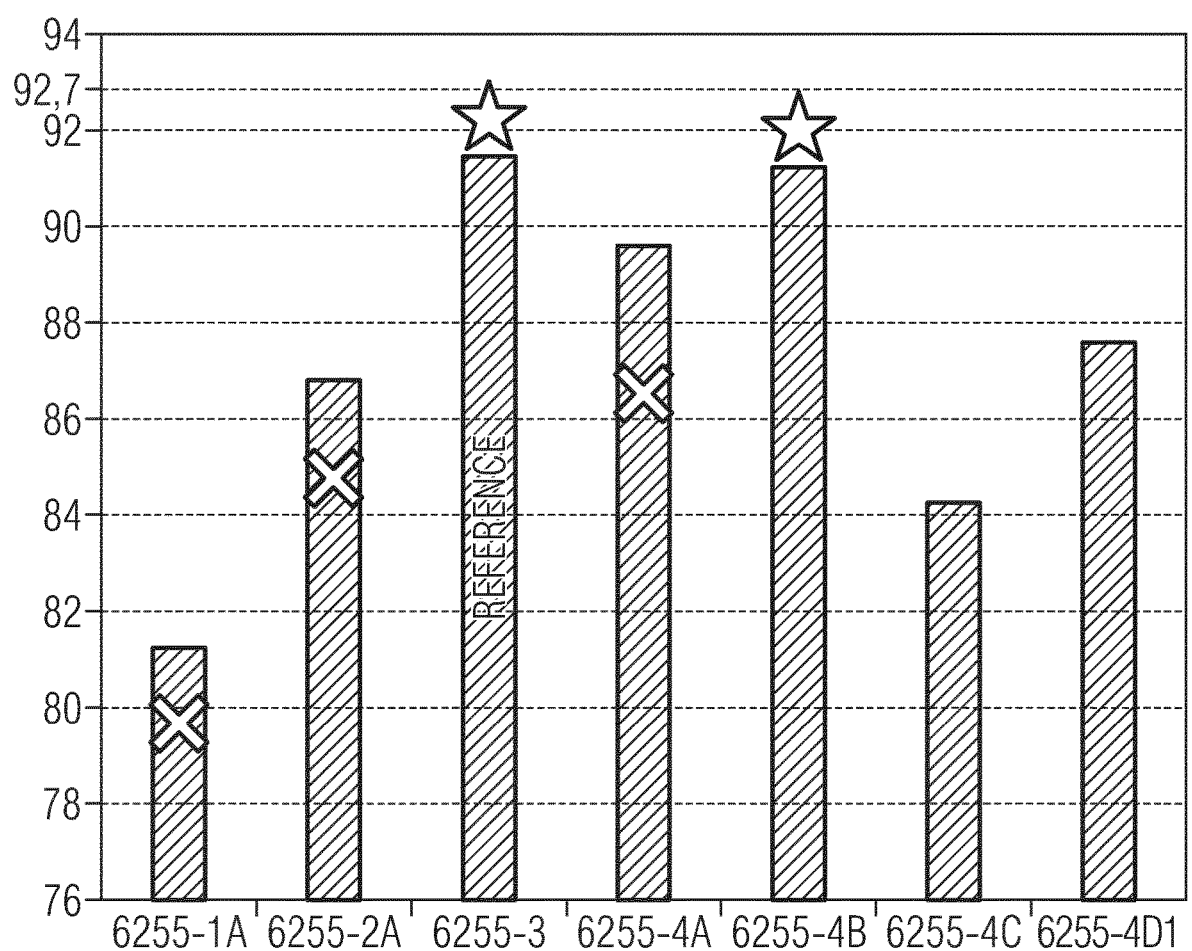

In the following, preferred embodiments of the invention will be described with reference to the drawings, of which:

FIG. 1a is showing a schematic, cross-sectional view of a laminated packaging material of the invention, which has a white polymer film as a print substrate layer on the outside of the bulk layer, the bulk layer being from a fluting material, and a gas barrier coated thin, high-density paper layer laminated to the inside of the bulk layer, FIG. 1b shows a schematic, cross-sectional view of a further embodiment of such a laminated packaging material, but having a barrier-coated polymer film laminated to the inside of the bulk layer instead, FIG. 2a shows schematically an example of a method, for laminating i.a. the print substrate polymer film to the bulk material in accordance with the invention, FIG. 2b shows schematically an example of a different method, for laminating i.a. the print substrate polymer film to the bulk material, in accordance with the invention, FIG. 3a, 3b, 3c, 3d show typical examples of packaging containers produced from the laminated packaging material according to the invention, FIG. 4 shows the principle of how packaging containers may be manufactured from the packaging laminate in a continuous, roll-fed, form, fill and seal process, and FIG. 5 is a diagram showing the result of testing several white print substrate films for the purpose of a white background print substrate in accordance with the invention.

In FIG. 1a, there is thus shown, in cross-section, a first embodiment of a laminated packaging material, 10a, of the invention. It comprises a bulk layer 11a of a brown fluting material, having a grammage from 100 to 300 g/m$^2$, such as herein used about 200 g/m$^2$.

On the inside, of the bulk or spacer layer 11a, the laminated material comprises a thin, high-density paper layer 14a being coated with a barrier coating 18a of a dispersion coatable barrier polymer composition, such as for example a PVOH or starch, or a vapour deposition barrier coating, such as a metallisation coating or a plasma enhanced chemical vapour deposition PECVD coating. The thin paper layer 14a is interacting in a sandwich structure with the bulk layer 11a and a thin, oriented polymer film print substrate, 12a also acting as an outside facing layer. The inside also comprises an innermost, heat sealable thermoplastic layer 15a, which is the layer of the packaging laminate that will be in direct contact with the filled food product in a final packaging container. The innermost, heat sealable polymer layer 15a is melt co-extrusion coated together with any intermediate tie layers, such as EAA, not shown, onto the gas barrier layer 18a.

The (co-)extrusion coating of the innermost layer 15a, and any intermediate tie layers may be done before or after lamination of the gas barrier layer 14a-18a to the bulk layer 11a.

The innermost heat sealable layer or multilayer 15a may alternatively be applied in the form of a pre-manufactured film, adding further stability and durability by being an oriented film to a higher degree than what is obtainable in extrusion coating operations. Such a film is then melt co-extrusion laminated to the gas barrier layer 14a-18a by the intermediate bonding layer 17a. Again, the inside material layers may be pre-laminated as a separate module inside, before laminating it to the bulk layer 11a.

In this particular embodiment, however, the thin, high-density paper layer is first laminated to the bulk layer 11a, or the other parts of the laminated material including the bulk layer, and subsequently melt extrusion coated on the inner side of gas barrier layer 14a-18a by the layer or multilayer 15a of a tie layer and an innermost heat sealable polymer being selected from polyolefins, such as polyethylenes, such as in this case a low density polyethylene composition comprising a blend of a metallocene-catalysed linear low density polyethylene (m-LLDPE) and a low density polyethylene (LDPE). If two layers are constituting the heat sealable layer, there may be a first layer of LDPE and a second innermost layer of the above blend.

On the other side, the outside of the bulk material layer 11a, the packaging material comprises a print substrate layer of a pre-manufactured, oriented polymer film of HDPE comprising inorganic filler particles, which is stretched and cavitated such that it is a white film, 12a, with a thickness of from 23 to 30 µm, and having a smooth print surface.

In the final laminated material, the substrate 12a is printed and decorated with a print pattern from various colours, images and text. The material outside of the bulk layer also may comprise an outermost transparent and protective layer 13a of a plastic, preferably a heat sealable thermoplastic, such as a polyolefin, such as a polyethylene material layer, such as LDPE. The print substrate layer 12a may be printed before or after lamination to the bulk layer, and the outermost plastic layer 13a be applied onto the printed substrate layer in a separate operation before or after lamination to the bulk layer 11a. If coating of the décor print with the plastic layer 13a takes place before lamination to the bulk layer, the whole outside material is thus prepared as one module, i.e. as a pre-laminated outside, which is then laminated to the bulk layer or to the rest of the laminate, on the outside of the bulk layer.

The thin, high-density print carrier layer for a barrier coating, which is also a paper facing layer 14a on the inside of the bulk and spacer layer 11a may be a paper with a gram mage from 20 to 100, such as from 30 to 80, such as from 30 to 60 g/m², and having a density from 600 to 1500 kg/m³. In a particular embodiment, it may be a greaseproof paper, alone or coated with a further barrier coating, such as for example a metallisation coating. Some greaseproof papers provide a further gas barrier of lower than 2 cc/m²/day/atm at 23° C. and 50% RH, when laminated between thermoplastic layers, such as polyethylene layers or the like, the outermost polymer layer 15a being one such adjacent thermoplastic polymer layer and the bonding layer 17a being the other such layer.

The operation of laminating the barrier-coated paper layer 14a-18a to the bulk layer may thus be to the bulk layer may be a melt extrusion lamination operation, thus applying an intermediate thermoplastic bonding layer 17a between the bulk layer and the barrier layer.

In this particular embodiment, however, the lamination of the barrier layer 14a-18a to the bulk layer 11a is carried out by applying a low amount of an aqueous solution of an adhesive that is partly absorbed into the bulk cellulose layer and efficiently adheres the two layers together, the adhesive being a starch or nano-/micro-fibrillar cellulose or polyvinyl alcohol or similar hydrophilic substances, which readily bond to cellulose molecules.

The lamination of the print substrate layer 12a to the bulk layer 11a is also carried out by applying a low amount of an aqueous solution of an adhesive being an aqueous dispersion of an acrylic-modified copylmer with ethylene at a solid content from 30 to 50 weight %. The acrylic functionality creates a good bond to the aluminium foil surface and thus provides good adhesion between the two laminated layers. The aqueous adhesive is partly absorbed into the cellulose surface of the bulk layer and efficiently adheres the two layers together. When the adhesive material has inherent barrier properties, of course such an adhesive, although applied by a very low amount, may contribute even further to the resulting oxygen barrier properties of the laminated packaging material.

Alternatively, but less preferred from an environmental and cost savings point of view, the outside print substrate layer 12a may be laminated to the bulk layer 11a by means of melt extrusion lamination with a thermoplastic bonding polymer such as LDPE or the like.

In FIG. 1b, a similar cross-section, of a second embodiment of a laminated packaging material, 10b, is shown. The laminated material is substantially the same as the material in FIG. 1a, except from the barrier layer being a polymer substrate film 14b coated with a barrier coating 18b. The bulk layer 11b is laminated to the film by an intermediate adhesive 17b. The innermost heat sealable layer 15b is the same or similar to 15a in the packaging material 10a. In order to add some stability to the sandwich construction there is a thin paper included in the bulk layer such that the bulk layer 11b is in this case comprising both a spacer layer 11b1 and a thin paper facing layer 11b2.

Again, the barrier coating 18b may be a dispersion coatable barrier polymer composition, such as for example a PVOH or starch, or a vapour deposition barrier coating, such as a metallisation coating or a PECVD coating. Alternatively, the barrier film 14b may be a film made from a polymer having inherent gas barrier properties.

In FIG. 2a it is schematically illustrated how one layer or module of layers may be laminated to another layer/module by cold aqueous adhesive absorption lamination, such that a very low amount of an aqueous adhesive solution is applied onto one of the surfaces to be laminated to each other, the aqueous adhesive solution then being absorbed into one or both of the two surfaces while adhering them together under the application of pressure. Thus, in the embodiments for manufacturing the laminated packaging materials in FIGS. 1a-1b, an aqueous adhesive solution is applied onto the surface to be laminated, of the outside layer/material module 1B;2B representing the layer(s) on the outside of the bulk layer 11a;11b, i.e. onto the non-print surface of the print substrate layer 12a;12b, in an adhesive application operation 21. At a lamination nip between two nip rollers, a web of the center module material 1A;2A representing the bulk layer comprising a spacer layer, is laminated at lamination station 22 to a web of the outside module material 1B;2B under simultaneous forwarding of the two webs through the lamination nip, at a pressure sufficiently high for adhereing the two surfaces together, but not so high that a low density bulk layer or the spacer layer of a sandwich structure is collapsed. The obtained web of the intermediate pre-laminate of two layers/modules 1A+1B;2A+2B is forwarded to a further lamination station for lamination to the third module or parts of it as will be described herein below in FIG. 2b, or alternatively wound up onto a reel for intermediate storage or transport to a different time or place, where the final lamination and finishing steps will take place. The cold aqueous adhesive absorption lamination method may also or alternatively be applied when laminating the inside material module 1C;2C to the center layer/module material or pre-laminated center and outside modules.

In FIG. 2b it is schematically illustrated how one layer/module may be laminated to another layer/module by melt extrusion lamination such that the two surfaces to be laminated are bonded to each other by an intermediate thermoplastic bonding layer. According to this example, the web of the pre-laminate of the two modules laminated in the example of FIG. 2a is forwarded to a lamination nip at the same time as a web of the inside material module 1C;2C. At the same time, a molten curtain of a thermoplastic bonding polymer 23;17a;17b is extruded down into the lamination roller nip, and being cooled while pressing the two webs together, such that sufficient adhesion is obtained between the cellulose-based center module, i.e. the surface of the bulk layer 11a;11b and the aluminium foil barrier 14a; 14b of the inside material module.

FIG. 3a shows an embodiment of a packaging container 30a produced from the packaging laminate 10a;10b;10c according to the invention. The packaging container is particularly suitable for beverages, sauces, soups or the like. Typically, such a package has a volume from about 100 to 1000 ml. It may be of any configuration, but is preferably brick-shaped, having longitudinal and transversal seals 31a and 32a, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

FIG. 3b shows an alternative, preferred example of a packaging container 30b produced from an alternative packaging laminate according to the invention. The alternative packaging laminate is thinner by having a thinner cellulose bulk layer 11, and thus it is not dimensionally stable enough to form a cuboid, parallellepipedic or wedge-shaped packaging container, and is not fold formed after transversal sealing 32b. It will thus remain a pillow-shaped pouch-like container and be distributed and sold in this form.

FIG. 3c shows a gable top package 30c, which is fold-formed from a pre-cut sheet or blank, from the laminated packaging material comprising a bulk layer of paperboard and the durable barrier film of the invention. Also flat top packages may be formed from similar blanks of material.

FIG. 3d shows a bottle-like package 30d, which is a combination of a sleeve 34 formed from a pre-cut blanks of the laminated packaging material of the invention, and a top 35, which is formed by injection moulding plastics in combination with an opening device such as a screw cork or the like. This type of packages are for example marketed under the trade names of Tetra Top® and Tetra Evero®. Those particular packages are formed by attaching the moulded top 35 with an opening device attached in a closed position, to a tubular sleeve 34 of the laminated packaging material, sterilizing the thus formed bottle-top capsule, filling it with the food product and finally fold-forming the bottom of the package and sealing it.

FIG. 4 shows the principle as described in the introduction of the present application, i.e. a web of packaging material is formed into a tube 41 by the longitudinal edges 42 of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

In FIG. 5 there is thus shown the whiteness of various outside print substrate films when laminated onto the outside of a brown bulk layer of cellulose-based fluting material. The reference packaging laminate has a clay-coated conventional paperboard as bulk material layer, which is laminated and covered with a further outermost transparent, heat sealable layer of LDPE, and shows an L-value whiteness of higher than 91 on a scale where 92,7 is considered a maximum possible or desirable value. The packaging laminate sample 6255-4B is in accordance with the invention, i.e. has a print substrate film which is a white pre-manufactured, oriented, cavitated film from an HDPE composition comprising mineral particles as well as some white pigment particles. The laminated film of this sample reaches almost the same whiteness value as the reference claycoated paperboard laminate, i.e. the brown under-lying bulk layer of fluting material is completely hidden beneath this white, cavitated film.

The other laminate samples did not reach at all near these desired values, and so the brown fluting material was darkening also the outside appearance of the laminated white films tested in these samples.

In samples 1A and 2A, biaxially oriented polypropylene films (BOPP) of thickness 20 μm and with only white pigments added were tested and the L-values obtained on the outside were much too low for being used as a white print background on the outside of a packaging container. These films were thus completely white in appearance before lamination to the fluting material. The sample 4A was a similar white BOPP film of 38 μm thickness, but which was in addition metallised on one side, which was believed to become an excellent light barrier and hence ability to hide the brown colour of the fluting layer. Even if the result was better, it was not sufficient and this is also considered a very expensive solution, since both metallisation and the white pigments, are rather expensive. Sample 4D1 was a metallised paper of grammage 53 g/m². The metallised paper was not able to hide the brown colour of the fluting material. Sample 4C is a cavitated white film of the same kind as of the invention, however with a lower thickness. Also this sample was not able to hide the brown colour of the fluting material, why it may be concluded that the film of the invention also has to have certain minimal thickness, while the other films tested were unable to hide the fluting material colour also at higher, reasonable thicknesses (compare sample 4A).

The cavitated film of the invention has thus been carefully selected among a series of alternative print substrates possible, for the specific purpose of laminating to a brown bulk layer of cellulose-based material.

The invention is not limited by the embodiments shown and described above, but may be varied within the scope of the claims. As a general remark, the proportions between thicknesses of layers, distances between layers and the size of other features and their relative size in comparison with each other, should not be taken to be as shown in the figures, which are merely illustrating the order and type of layers in relation to each other. All other features are to be understood as described in the text specification.

The invention claimed is:

1. Laminated cellulose-based, liquid- or semi-liquid food packaging material, for heat sealing into aseptic packaging containers containing food product, comprising a bulk material layer comprising a brown or dark cellulose-based fibre material that has a brown or dark surface facing outward so that the brown or dark surface is on a side to face away from the food product in the packaging container made from the laminated material, a layer comprising an oxygen barrier layer or coating arranged on an inside of the bulk layer so that the oxygen barrier layer or coating is on the side to be directed inwards to the food product in the packaging container made from the laminated material, and further on an inside of the oxygen barrier layer, an innermost, heat sealable and liquid-tight layer of a thermoplastic polymer, the innermost polymer layer intended to be in direct contact with the food product packaged in the packaging container, the laminated packaging material further comprising a print substrate layer arranged on an outside of the brown or dark surface of the bulk layer and possessing a thickness of 22 μm to 35 μm, wherein the print substrate layer is a white pre-manufactured, oriented, cavitated film from a thermoplastic polymer composition comprised of a polyolefin, the thermoplastic polymer composition also comprising 40 weight-% to 85 weight-% of mineral filler particles selected from the group consisting of consisting of dolomite and calcium carbonate $CaCO_3$, the thermoplastic polymer composition also comprising 1 weight-% to 10 weight-% of white titanium oxide pigment particles.

2. Laminated packaging material as claimed in claim 1, wherein the thermoplastic polymer composition of the print substrate layer film is a high density polyethylene (HDPE).

3. Laminated packaging material as claimed in claim 1, wherein the thermoplastic polymer composition is a high density polyethylene (HDPE), the mineral filler particles are present in an amount from 50 weight-% to 60 weight-%, and the white titanium oxide pigment particles are present in an amount from 1 weight-% to 5 weight-%.

4. Laminated packaging material as claimed in claim 1, wherein the thickness of the print substrate layer film is from 23 to 28 μm.

5. Laminated packaging material as claimed in claim 1, wherein the bulk material layer has a grammage from 100 to 300 g/m².

6. Laminated packaging material as claimed in claim 1, wherein the bulk material layer comprises a containerboard material.

7. Laminated packaging material as claimed in claim 1, wherein the print substrate layer film is laminated to the bulk layer by an aqueous adhesive composition, which is applied at an amount from 0.5 to 4 g/m2 and partly absorbed into the cellulose surface of the bulk layer.

8. Laminated packaging material as claimed in claim 1, wherein the print substrate layer film is further coated on its outer side facing away from the bulk layer with an outermost, transparent, protective layer of a thermoplastic polymer.

9. Laminated packaging material as claimed in claim 1, wherein the thermoplastic polymer of the innermost heat sealable layer is polyethylene.

10. Laminated packaging material as claimed in claim 1, wherein the oxygen barrier layer is an aluminium foil and or a polymer film having gas barrier properties.

11. Laminated packaging material as claimed in claim 1, wherein the oxygen barrier layer or coating is a polymer film or a thin paper coated with a barrier coating.

12. Liquid- or semi-liquid food packaging container comprising the laminated packaging material as defined in claim 1.

13. Method for manufacturing the laminated cellulose-based, liquid- or semi-liquid food packaging material as defined in claim 1, comprising, in any order,
 a) laminating the print substrate layer to a first, outer side of the brown or dark cellulose-based bulk material layer, the brown or dark cellulose-based bulk material layer having a brown or dark surface facing outward so that the brown or dark surface is on a side to face away from the food product in the packaging container made from the laminated material comprised of a polyolefin, the print substrate layer being a white pre-manufactured, oriented, cavitated film from a thermoplastic polymer composition comprised of a polyolefin, the thermoplastic polymer composition also comprising 40 weight-% to 85 weight-% of mineral filler particles selected from the group consisting of consisting of dolomite and calcium carbonate $CaCO_3$, the thermoplastic polymer composition also comprising 1 weight-% to 10 weight-% of white titanium oxide pigment particles,
 b) laminating the oxygen barrier layer to a second inner side of the brown or dark cellulose-based bulk material layer, the second inner side being opposite the first outer side of the brown or dark cellulose-based bulk material layer, and
 c) applying the innermost heat sealable thermoplastic polymer layer on the non-laminated (in)side of the oxygen barrier layer.

14. Method as claimed in claim 13, wherein the print substrate layer is laminated to the bulk material layer by applying an aqueous adhesive composition onto the print substrate layer and allowing the adhesive composition to absorb into the cellulose surface of the bulk layer, while pressing the layers to adhere to each other by letting them pass through at least one lamination roller nip.

* * * * *